Nov. 8, 1938.   C. C. KING   2,135,580
GROUND WORKING IMPLEMENT
Filed Sept. 13, 1937   4 Sheets-Sheet 1
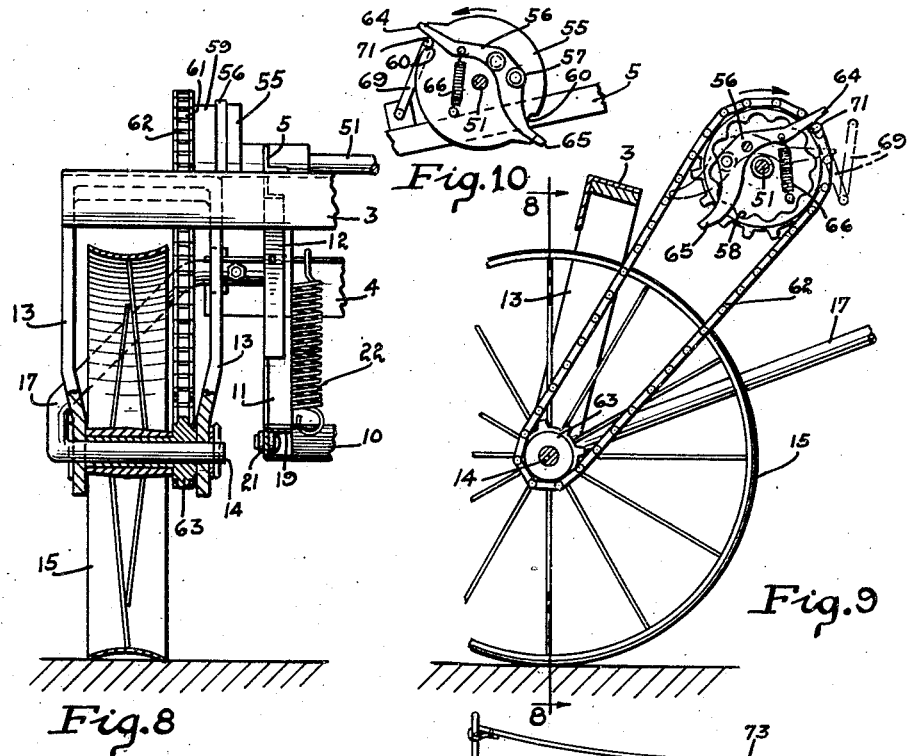
INVENTOR
CLARK C. KING
BY *Paul, Paul Moore*
ATTORNEYS

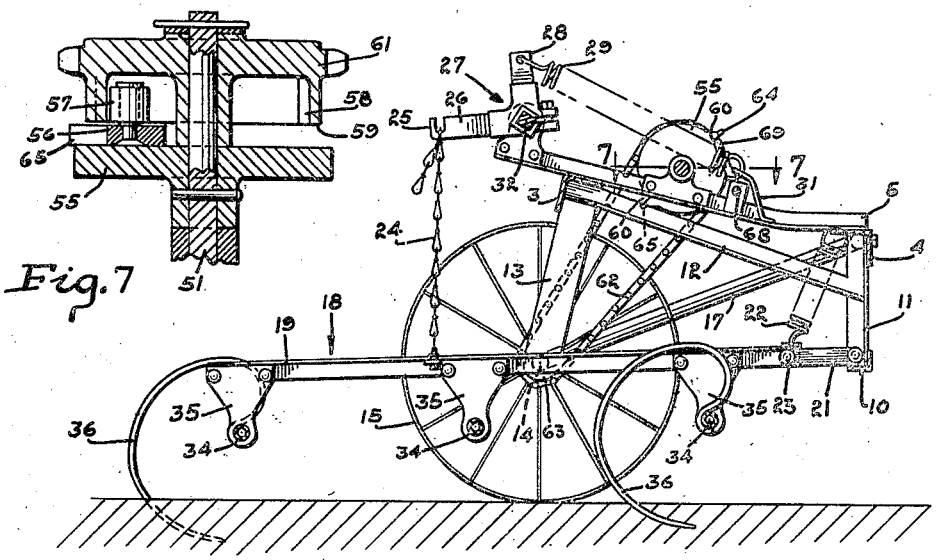
Fig. 7
Fig. 5
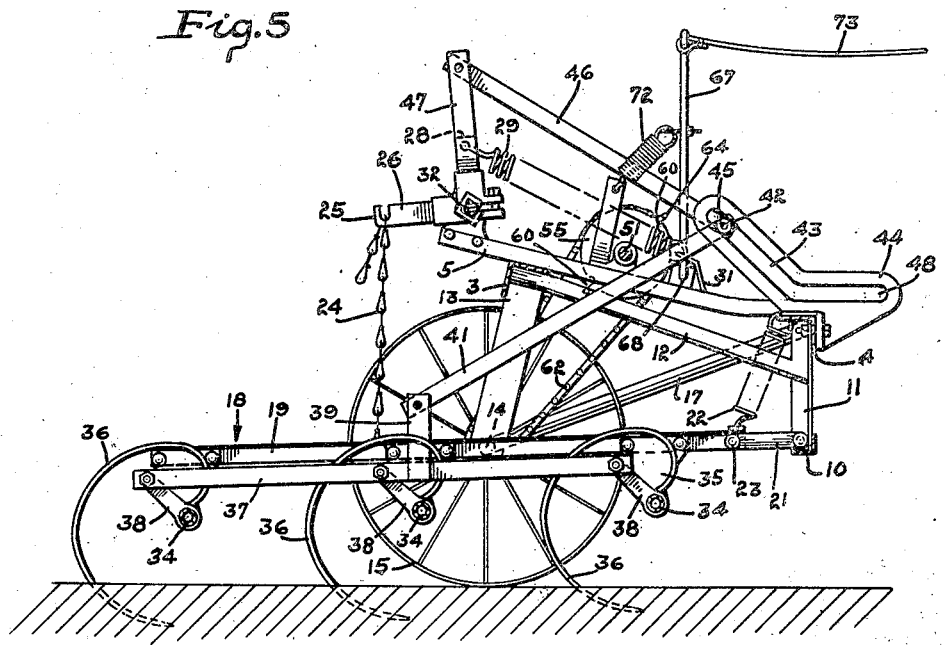
Fig. 4

Nov. 8, 1938.   C. C. KING   2,135,580
GROUND WORKING IMPLEMENT
Filed Sept. 13, 1937   4 Sheets-Sheet 4

INVENTOR
CLARK C. KING
BY Paul, Paul & Moore
ATTORNEYS

Patented Nov. 8, 1938

2,135,580

UNITED STATES PATENT OFFICE 2,135,580

GROUND WORKING IMPLEMENT

Clark C. King, Owatonna, Minn., assignor to Jos. J. Kovar Co., Inc., Owatonna, Minn., a corporation of Minnesota Application September 13, 1937, Serial No. 163,570

9 Claims. (Cl. 97—72)

This invention relates to new and useful improvements in spring-tooth harrows or cultivators and more particularly to the means provided for moving the teeth or ground working elements out of or into working engagement with the ground.

An object of the present invention is to provide a spring tooth harrow or cultivator including a wheeled frame having one or more auxiliary frames mounted thereon for vertical movement, and each auxiliary frame carrying a plurality of ground engaging elements or teeth adapted for limited rotary movement, when the auxiliary frames are vertically translated to move the teeth into or out of working relation with respect to the ground, thereby to permit foreign matter to readily drop or discharge from said teeth by gravity, when the teeth are elevated to a position above the ground.

A further object is to provide an apparatus of the character described, comprising a main frame having an auxiliary frame mounted thereon and carrying a plurality of spring teeth, and the forward end of the auxiliary frame being connected to the main frame suitable links, and a lifting mechanism being provided for said auxiliary frame which is so constructed that each time it is operated to lift the auxiliary frame to move the teeth out of engagement with the ground, the teeth, after being moved out of the ground, are rotated in a direction to cause trash or rubbish engaged therewith to readily drop off by gravity, whereby the teeth may be substantially clean and free from foreign matter, each time they are lowered into working engagement with the ground.

A further object is to provide a power lift spring-toothed harrow or cultivator including a wheeled frame, and one or more auxiliary frames each carrying a plurality of ground-engaging teeth, and the forward ends of said auxiliary frames having link connections with the wheeled frame which permit the forward ends of the auxiliary frames to be readily elevated, when said frames are operated to move the teeth out of engagement with the ground, and whereby the auxiliary frames are disposed in substantially parallel relation to the ground, so that the lower terminals of all of the teeth will be supported well above the ground, when in inoperative positions, as when transporting the apparatus from one place to another.

Other objects of the invention reside in the novel construction of the lifting mechanism, which is so constructed that it has the dual function of lifting the teeth out of the ground and partially rotating them in a forward direction, to permit foreign matter accumulating on the teeth to drop therefrom, each time the lifting mechanism is operated to elevate the teeth out of the ground; in the novel means provided for connecting the auxiliary frames to the main frame, whereby the auxiliary frames may readily be vertically adjusted to control the depth of the teeth in the ground; in the means provided for positively holding the auxiliary frames in operative position, when the teeth are engaged with the ground, whereby the teeth cannot readily become disengaged therefrom; and, in the provision of such a machine which is extremely rugged and substantial in construction, and is so designed that it may be manufactured at small cost, and which is particularly well adapted to be propelled by a tractor, although it is to be understood that it may be propelled by other means.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a vertical sectional view on the line 1—1 of Figure 6;

Figure 4 is a vertical sectional view on the line 4—4 of Figure 6, showing the parts in the positions illustrated in Figure 3;

Figure 5 is a vertical sectional view on the line 5—5 of Figure 6;

Figure 7 is an enlarged detail sectional view on the line 7—7 of Figure 5, showing the clutch mechanism;

Figure 8 is a detail sectional view on the line 8—8 of Figure 9, showing the power drive for the lifting mechanism;

Figure 9 is a fragmentary view showing the power lifting mechanism;

Figure 10 is a fragmentary view showing a portion of the clutch; and

Figure 3:
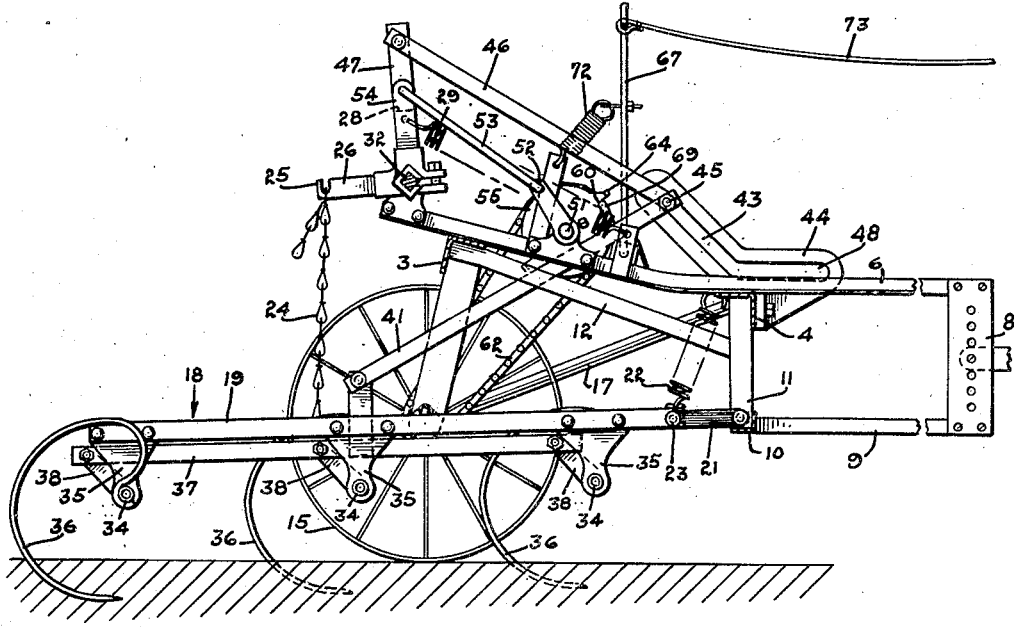
Figure 3 is a similar view showing the teeth lowered into engagement with the ground.

The novel apparatus herein disclosed is shown including a main frame, generally indicated by the numeral 2, and comprising a rear cross member 3 and a front cross member 4 secured together in spaced relation by suitable frame members 5 and 6, which may be welded or otherwise secured to the cross members 3 and 4 to provide a rigid structure. Diagonal braces 7 are shown secured to the upper surfaces of the cross members 3 and 4, and extend forwardly thereof and have their forward terminals secured to the upper end of a suitable draft plate 8, the lower end of which is secured to a pair of diagonal braces 9, having their rear terminals secured to a longitudinally extending bar 10, supported from the cross member 4 of the main frame by suitable uprights 11. The uprights 11 have their upper ends suitably secured to the front cross member 4. Diagonal braces 12 are interposed between the rear frame member 3 and the uprights 11, and cooperate with the uprights 11 and longitudinally extending angle bar 10 to provide a rigid frame structure.

A pair of downwardly extending arms 13 are provided at each end of the rear cross member 3 of the main frame and support at their lower ends, axles 14, upon which are mounted suitable carrying wheels 15 and 16. The axles 14 are non-rotatable, and are provided at their outer ends with forwardly extending portions 17, the terminals of which are suitably secured to the front cross member 4 of the main frame, whereby they securely brace the arms 13 to the main frame, as will be readily understood by reference to the various figures of the drawings.

The machine, as illustrated in the accompanying drawings, is shown provided with two auxiliary frames, generally indicated by the numeral 18. The side rails 19 of the auxiliary frames 18 have their forward ends secured to the cross bar 10 of the main frame by suitable links 21, whereby the forward ends of the frames 18 are adapted for limited vertical movement, as will readily be understood by reference to Figures 2 and 3. Suitable spring elements 22 connect the forward ends of the frames 18 to the cross member 4 of the main frame, and constantly exert an upward pull on the rear ends of the links 21.

The rear portions of the frames 18 are supported by suitable flexible connections 24, preferably in the form of chains, whose lower ends are suitably connected to the frames 18. The opposite ends of the chains 24 are adjustably connected to the hooked terminals 25 of the arms 26 of a plurality of bell cranks 27, best shown in Figure 5. The bell cranks 27 are constantly urged in a direction to elevate the auxiliary frames 18, by suitable springs 29, having their rear ends connected to the upright arms 28 of the bell cranks, and their forward ends to suitable brackets 31 secured to the main frame.

The bell cranks 27 are non-rotatably secured to a rock shaft 32 mounted for rocking movement in suitable brackets secured to the rearwardly extending portions of the main frame members 5 and 6.

Figure 11:
Figure 11 is an enlarged cross sectional view showing the preferred cross section of the teeth.

Each auxiliary frame 18 is shown comprising a plurality of shafts 34 mounted for rocking movement in suitable pendently supported brackets 35, secured to the side members 19 of the frames 18. To the shafts 34 are secured a plurality of ground engaging elements as, for example, harrow teeth 36, commonly known as spring teeth. These teeth are made of a suitable spring steel, whereby they may readily yield when they engage an obstruction in the ground. The teeth are preferably shaped, cross-sectionally, as illustrated in Figure 11, whereby their outer edges 30 are relatively thinner than their center portions so that a ridge 40 is provided on each tooth which may extend the full length thereof. By thus shaping the teeth, a scouring action is obtained, as clearly set forth in Patent No. 2,036,052, granted to me on March 31, 1936.

An important feature of the present invention resides in the mechanism provided for moving the teeth 36 into or out of engagement with the ground. This mechanism is so arranged that when the teeth are moved out of engagement with the ground, they are relatively rotated to the position shown in Figure 1, when they approach the limit of their upward movement, whereby foreign matter, such as rubbish and trash, which may accumulate on the teeth, when working in the ground, may readily drop or discharge from the teeth by gravity, as will readily be understood by reference to Figure 1.

The mechanism provided for thus relatively rotating the teeth each time they are moved out of operative engagement with the ground, is shown comprising a connecting bar 37 pivotally connected to arms 38 secured to the shafts 34, whereby all of said shafts will be rotated simultaneously, when the connecting bar 37 is longitudinally translated. A post 39 is shown secured to each connecting bar 37, and have the rear ends of suitable thrust members 41 suitably connected thereto.

Figure 6:
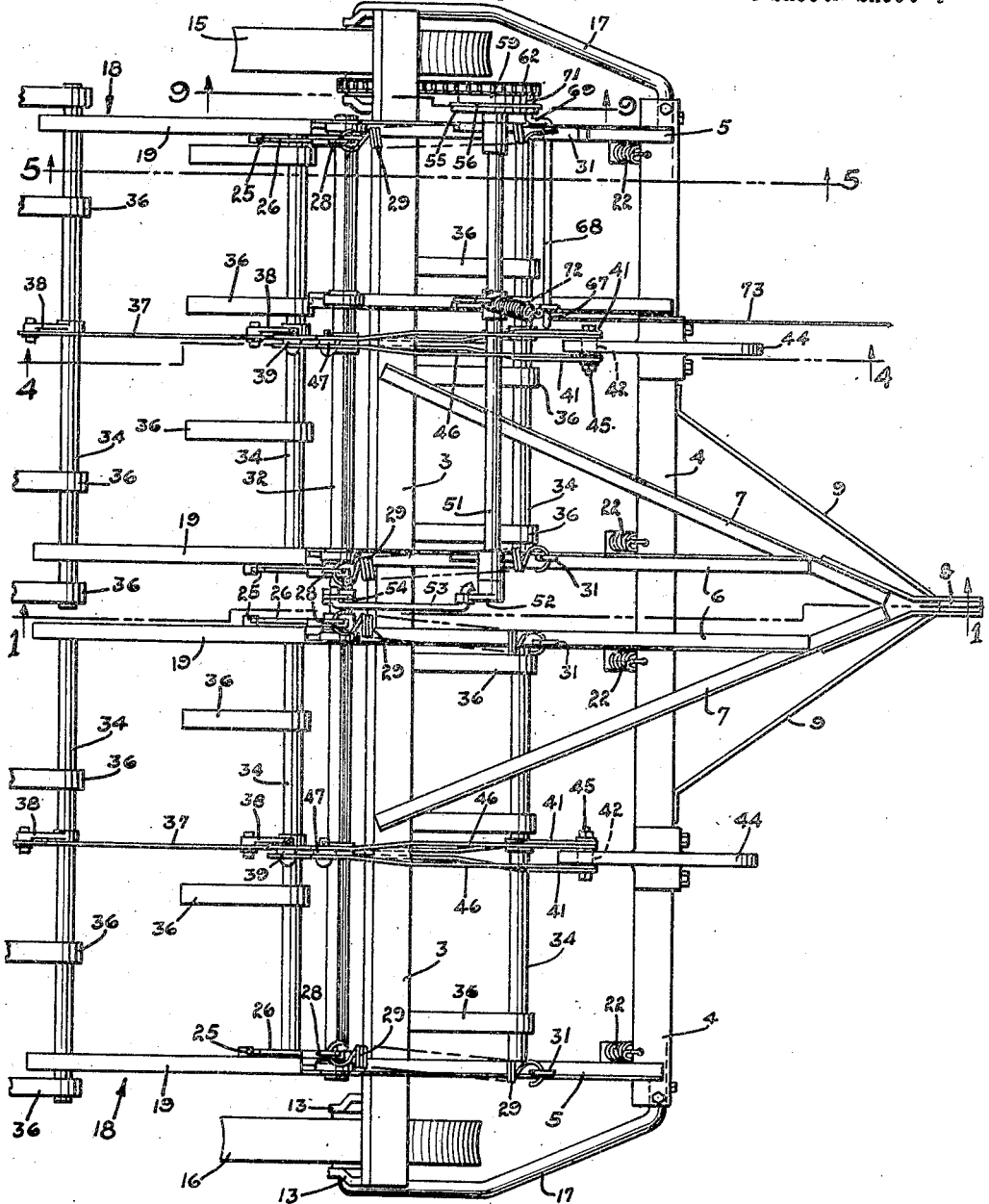
Figure 6 is a plan view of the apparatus.

The opposite or forward end of each thrust member 41 is preferably provided with a roller 42, which rollers are guidingly supported in slots 43 provided in suitable brackets 44, shown secured to the front cross member 4 of the main frame. The thrust members 41 are preferably arranged in pairs, whereby the posts 39 and brackets 44 are interposed therebetween, as will readily be understood by reference to Figures 4 and 6. Connecting rods 46 are shown having their lower ends pivotally connected to the pivots 45 which support the rollers 42, and the upper ends of the rods 46 are similarly connected to arms 47 secured to the rock shaft 32.

When the teeth 36 are in engagement with the ground, the rollers 42 of the thrust members 41 are positioned in the upper portions of the inclined slots 43, whereby the walls of the slots are substantially at right angles to the longitudinal center lines of the thrust members 41. By this arrangement, the two auxiliary frames 18 are locked in working position, when the teeth are engaged with the ground, as shown in Figures 3 and 4, whereby the teeth cannot be thrust out of the ground, as the result of a tooth striking a stone or other obstruction therein. The inclined slots 43 are connected at their lower ends with horizontally disposed slots 48, which provide continuations of the lower ends of the inclined slots 43.

When the frames 18 are elevated to lift the teeth 36 out of engagement with the ground, the rollers 42 travel downwardly in the inclined slots 43 into the horizontal slots 48, after which continued movement of the rock shaft 32 will cause the rollers 42 to be moved toward the forward ends of the horizontal slots 48. Such movement of the rollers 42 in the horizontal slots 48 will impart longitudinal movement to the connecting members 37, whereupon the shafts 34, to which the teeth 36 are secured, will be rotated in a forward direction. Such rotation of the shafts 34 will rotate the teeth 36 in a forward direction, thereby lifting the terminals of the teeth 36 into the positions shown in Figure 1. When thus positioned, trash and rubbish which may have accumulated on the teeth, will readily drop off the teeth by gravity, whereby the teeth are substantially free of foreign matter when again lowered into engagement with the ground.

The mechanism provided for moving the teeth into or out of engagement with the ground, is power operated, and is so constructed that it is positive in operation, both when lifting the teeth out of engagement with the ground or moving them into engagement therewith. The means provided for thus operating the lifting mechanism, is best illustrated in Figures 8, 9, and 10, and comprises a short shaft 51, rotatably supported in suitable bearings provided on the main frame of the machine. The shaft 51 is provided at its inner end with a crank arm 52, to which one end of a connecting rod 53 is connected. The opposite end of the rod 53 is connected to an arm 54 secured to the rock shaft 32.

The opposite or outer end of the shaft 51 is shown provided with a disk 55, upon which is suitably mounted a spring-actuated latch 56, carrying a roller 57 which is adapted to interlock with suitable inwardly facing notches 58, shown provided in the cylindrical portion 59 of a sprocket wheel 61. The sprocket wheel 61 is constantly driven by a suitable chain 62 and sprocket 63. The sprocket 63 is suitably secured to the hub of the carrying wheel 15 whereby it rotates synchronously therewith.

The disk 55 is shown spaced from the adjacent end of the cylindrical portion 59 of the sprocket wheel 61, to permit the terminals 64 and 65 of the latch 56 to project outwardly between the disk 55 and cylindrical portion 59, as clearly illustrated in Figure 7. It will be noted that when thus positioned, the roller 57 of the latch 56 is alined with the notches 58 in the cylindrical portion 59. A spring 66 is operatively connected to the latch 56 and constantly urges it in a direction to move the roller 57 into locking engagement with one of the notches 58 in the cylindrical portion 59 of the sprocket wheel 61.

The means for controlling the operation of the clutch mechanism, is best illustrated in Figures 7, 9, and 10, and is shown comprising a control lever 67, in the form of a rod having a horizontally disposed portion 68 mounted in suitable bearings provided on the machine frame. The outer end of the rod 68 has a crank 69 whose outwardly projecting terminal 71 is adapted to be positioned in the path of the terminals 64 and 65 of the latch 56, whereby the latch is positively moved out of driving engagement with the sprocket wheel 61, each time one of the terminals of the latch impinges against the terminal 71 of the crank 69. It is to be understood that the sprocket wheel is freely rotatable on the shaft 51, so that when the roller 57 of the latch 56 is out of driving engagement with the notches 58 of the sprocket 61, the lifting mechanism of the machine is inoperative. The periphery of the disk 55 is preferably provided with oppositely disposed recesses 60, adapted to receive the terminal 71 of the crank 69, when the latter is in the full line position shown in Figure 10.

The clutch mechanism is so constructed that when the crank arm 69 is moved from the full to the dotted line position, shown in Figure 9, the spring 66 will actuate the latch 56 to move the roller 57 into driving engagement with one of the notches 58 in the sprocket wheel 61. When the roller 57 is thus engaged with one of the notches 58, the shaft 51 is rotated one-half revolution, whereby the crank arm 52 will transmit movement to the shaft 32 to either lift or lower the teeth supporting frames 18, depending upon the positions thereof before the latch 56 is actuated.

When the disk has been rotated a half revolution from the position shown in Figure 9, the opposite end 65 of the latch member will engage the terminal 71 of the crank 69 and again move the roller 57 out of driving engagement with the sprocket wheel 61, whereupon the lifting mechanism comes to rest. It is to be understood that each time the lever 67 has been actuated to cause the lifting mechanism to operate, it is preferably immediately released, so that the crank 69 is returned to its operative position, shown in full lines in Figure 10, before the disk has made a half revolution. This is necessary in order to retain the auxiliary frames 18 in either their operative or inoperative positions. In other words, the lifting mechanism is rendered operable only when the crank pin 71 is moved out of engagement with the terminals 64 or 65 of the latch 56, by manipulation of the control lever 67.

The novel apparatus, herein disclosed, is particularly well adapted for use in connection with a tractor. When thus operated, a suitable cable or rope 73 is secured to the upper end of the lever 67, whereby the operator of the tractor may conveniently control the operation of the lifting mechanism, as will readily be understood.

In the operation of the apparatus, the teeth 36 are lowered into working engagement with the ground by forwardly moving the operating lever 67, whereby the crank arm 69 will release the latch member 56 to permit the spring 66 to move the roller 57 into driving engagement with one of the notches 58, of the constantly rotating sprocket wheel 61. The operating lever 67 is immediately released, whereby the spring 72 returns it to its normal position, shown in full lines in Figure 2. When thus positioned, the crank pin 71 is returned to its normal position in the path of the terminals 64 and 65 of the latch 56, so that one of said terminals will engage the crank 71 and thereby cause the latch member to be actuated to throw the roller out of driving engagement with the notched member 59 of the sprocket wheel.

When the teeth are engaged with the ground, as shown in Figure 4, the thrust members 41 will have their upper ends so positioned with respect to the inclined slots 43 in the brackets 44, that the auxiliary frames 18 are locked in their lowered positions, whereby said frames cannot be elevated as a result of a tooth engaging an obstruction. When the auxiliary frames 18 are in their operative positions, as shown in Figure 4, it will be noted that the links 21 which connect the forward ends thereof to the cross member 10 of the main frame, will be substantially alined with the side rails 19 of the auxiliary frames.

Figure 2:
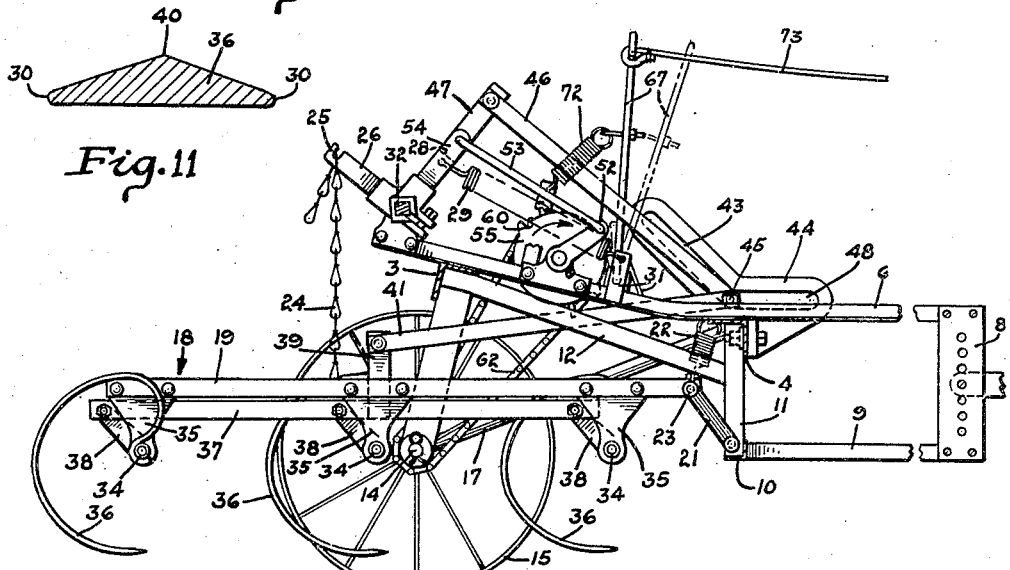
Figure 2 is a view similar to Figure 1, but showing the teeth rotated to operative positions before being lowered into the ground.

When it is desired to lift the teeth out of engagement with the ground, the operating lever 67 is again thrown forwardly to the dotted line position shown in Figure 2, by manipulation of a cable 73 on the tractor or prime mover, whereby the latch member 56 is actuated by the spring 66 to again throw the roller into driving engagement with one of the notches 58 in the constantly rotating sprocket wheel 61. As soon as the latch member thus becomes interlocked with the cylindrical portion 59 of the gear 61, the shaft 51 is again rotated one-half revolution and comes to rest with the crank 52 in the position shown in Figure 1. When the crank 52 reaches said position, the clutch is again rendered inoperative as a result of one of the terminals of the latch member 56 engaging the crank 71 which, as previously stated, renders the clutch inoperative.

When the clutch is operated to elevate the auxiliary frames 18 from the position shown in Figure 3 to that shown in Figure 1, the springs 22 at the front ends of the frames 18 will cause said ends to swing upwardly, as a result of said ends being pivotally connected to the main frame by the links 21, whereby the front ends of the frames 18 are elevated to a position to cause the auxiliary frames to be positioned substantially in parallel relation to the ground line. The bell cranks 27 are retained in the position shown in Figure 1 by the springs 29, as will readily be understood by reference to Figure 1.

In the operation of elevating the auxiliary frames 18 to lift the teeth out of the ground, the teeth are relatively rotated from the position shown in Figure 2, to that shown in Figure 1, when the roller 42 enters the horizontal slots 48 and move forwardly therein to the position shown in Figure 1. The slots 43 and 48 therefore have the dual function of locking the auxiliary frames 18 in their lower or operative positions, and also relatively rotating the teeth 36 upon said frames, to cause foreign matter accumulated thereon to readily drop therefrom, when the teeth are raised to an operative position. When the auxiliary frames are lowered to move the teeth into engagement with the ground, the teeth are first rotated from the position shown in Figure 1, to that shown in Figure 2, as a result of the rearward movement of the rollers 42 in the horizontal slots 48. When the teeth assume the position shown in Figure 2, the rollers 42 travel upwardly in the inclined slots 43, whereby the teeth are retained in their operative position on the auxiliary frames so that they may readily dig into the ground, when moved into contact therewith, as the auxiliary frames are lowered.

In the accompanying drawings and in the specification, I have shown the ground engaging elements in the form of spring teeth, such as commonly used in spring tooth harrows. It is to be understood that other ground engaging elements suitable for the purpose, may be used, without departing from the scope of the invention. It is also to be understood that I do not wish to be limited to the specific construction of the machine frame, nor the construction of the lifting mechanism as, obviously, various changes may be made in the construction thereof without departing from the scope of the invention.

I claim as my invention:

1. In an apparatus of the class described, a main supporting frame, an auxiliary frame mounted on said main frame and adapted for vertical movement, a plurality of ground engaging elements movably supported on the auxiliary frame, a mechanism for vertically translating the auxiliary frame to move said elements into or out of engagement with the ground, a guide slot in the main frame having inclined and horizontally disposed portions, and a member having one end secured to the auxiliary frame and its opposite end received in said slot, the angular shape of said guide slot causing the ground engaging elements to be partially rotated only after said elements have been moved out of the ground, whereby foreign matter accumulated thereon may discharge therefrom.

2. In an apparatus of the class described, a main supporting frame, an auxiliary frame mounted on said main frame and adapted for vertical movement, a plurality of ground engaging elements movably supported on the auxiliary frame, means for elevating the auxiliary frame to move said elements into or out of engagement with the ground, an angular guide fixed on the main frame, a member connected to the auxiliary frame and having one end guidingly supported in said guide, said guide and member causing partial rotation of said ground engaging elements when said auxiliary frame is elevated to a predetermined position out of the ground, whereby foreign matter accumulated thereon may discharge from the teeth, said guide means causing said ground engaging elements to return to operative positions on the auxiliary frame, when said auxiliary frame is initially actuated to move said elements into engagement with the ground.

3. In an apparatus of the class described, a wheeled frame, an auxiliary frame having its forward end pivotally connected to the wheeled frame, a plurality of ground engaging teeth movably supported on the auxiliary frame, a mechanism for vertically translating said auxiliary frame to move the teeth into or out of engagement with the ground, and means for imparting relative rotary movement to said teeth, when said auxiliary frame approaches the limit of its upward movement.

4. In an apparatus of the class described, a main frame, supporting wheels therefor, an auxiliary frame having its forward end pivotally connected to the main frame, a plurality of ground engaging teeth movably supported on said auxiliary frame, a mechanism for vertically translating said auxiliary frame to move the teeth into or out of engagement with the ground, clutch means associated with one of said wheels and adapted to operate said mechanism, and means for imparting rotary movement to said teeth, when moved out of engagement with the ground, to permit foreign matter to readily discharge therefrom.

5. In an apparatus of the class described, a wheeled frame, an auxiliary frame, links pivotally connecting the forward end of the auxiliary frame to the wheeled frame, thereby to facilitate vertically adjusting the forward end of said auxiliary frame, a plurality of ground engaging teeth movably supported on the auxiliary frame, a mechanism for vertically translating said auxiliary frame to move the teeth into or out of engagement with the ground, and means for imparting rotary movement to said teeth when they approach the limit of their upward movement.

6. In an apparatus of the class described, a wheeled frame, an auxiliary frame, links pivotally connecting the forward end of the auxiliary frame to the wheeled frame, a plurality of ground engaging teeth movably supported on the auxiliary frame, a mechanism for vertically translating said auxiliary frame to move the teeth into or out of engagement with the ground, and means for imparting rotary movement to said teeth, when the auxiliary frame approaches the limit of its upward movement, to permit foreign matter accumulated thereon to discharge therefrom, said means comprising an angular guide slot having one end of a connecting member guidingly supported therein whose opposite end is operatively connected to said teeth.

7. In an apparatus of the class described, a main frame, an auxiliary frame having a plurality of spring teeth mounted thereon, links pivotally connecting the forward end of the auxiliary frame to said main frame, whereby the forward end of the auxiliary frame may be vertically translated, a mechanism for vertically translating said auxiliary frame to move the teeth into or out of engagement with the ground, and means made operative by vertical movement of the auxiliary frame to relatively rotate said teeth, when the auxiliary frame has been operated to elevate said teeth to a predetermined position out of the ground, whereby foreign matter accumulated on the teeth may discharge therefrom by gravity.

8. In an apparatus of the class described, a wheeled frame, an auxiliary frame having a plurality of shafts mounted thereon, a plurality of ground engaging teeth secured to said shafts, means operatively connecting together said shafts for simultaneous rotary movement, a rock shaft on the main frame, means operatively connecting the auxiliary frame with said rock shaft, whereby, when the rock shaft is rotated, said auxiliary frame is vertically translated, an angular guide slot on the main frame, an element mounted for sliding movement in said slot, an arm secured to the rock shaft, a connecting member operatively connecting said arm to said element whereby, when the rock shaft is rotated, said element is relatively moved in the slot, means operatively connecting said element to the shafts on the auxiliary frame, whereby when said element is thrust forwardly in the guide slot, said teeth will be relatively rotated to a position to cause foreign matter accumulating thereon to discharge therefrom, when the auxiliary frame approaches the limit of its upward movement, and power operated means for actuating said rock shaft.

9. In an apparatus of the class described, a wheeled frame, an auxiliary frame having a plurality of shafts mounted thereon, a plurality of ground engaging teeth secured to said shafts, means operatively connecting together said shafts for simultaneous operation, a rock shaft on the main frame, means operatively connecting the auxiliary frame with said rock shaft, whereby, when the latter is rotated, said auxiliary frame is vertically translated, an angular guide slot on the main frame, an arm secured to the rock shaft, a connecting member having one end connected to said arm and having its opposite end guidingly supported by said slot, whereby, when the rock shaft is rotated, said connecting member is thrust forwardly, thereby to impart relative rotary movement to said teeth, to permit foreign matter accumulated thereon to discharge therefrom, when the auxiliary frame approaches the limit of its upward movement, power operated means for actuating said rock shaft, and means for manually controlling the operation of said power operated means.

CLARK C. KING.